United States Patent [19]

Sumita et al.

[11] Patent Number: 5,218,548
[45] Date of Patent: Jun. 8, 1993

[54] METHOD FOR DISPLAYING A FIGURE ON A CATHODE RAY TUBE OF A NUMERICAL CONTROL SYSTEM

[75] Inventors: Mitsutaka Sumita; Kazuaki Hino, both of Aichi, Japan

[73] Assignee: Mitsubishi Denki K.K., Tokyo, Japan

[21] Appl. No.: 417,944

[22] Filed: Oct. 6, 1989

[30] Foreign Application Priority Data

Oct. 7, 1988 [JP] Japan .................. 63-253077

[51] Int. Cl.⁵ .................. G05B 19/18; G06F 15/46
[52] U.S. Cl. .................. 364/474.26; 364/474.04; 364/474.18; 364/474.35
[58] Field of Search .................. 318/572; 364/191–193, 364/474.02, 474.04, 474.18, 474.25, 474.26, 474.29, 474.35, 474.19, 474.23

[56] References Cited

U.S. PATENT DOCUMENTS

| | | | |
|---|---|---|---|
| 4,390,278 | 6/1983 | Inoue | 356/392 |
| 4,521,860 | 6/1985 | Kanematsu et al. | 364/191 |
| 4,635,185 | 1/1987 | Kishi et al. | 364/191 |
| 4,648,028 | 3/1987 | Deklotz et al. | 364/474.23 |
| 4,678,976 | 7/1987 | Inoue | 364/184 |
| 4,703,146 | 10/1987 | Kinoshita | 318/572 |
| 4,706,200 | 11/1987 | Kishi et al. | 318/572 |
| 4,720,796 | 1/1988 | Kishi et al. | 364/474.18 |
| 4,745,558 | 5/1988 | Kishi et al. | 364/474.18 |
| 4,939,664 | 7/1990 | Nankaku | 318/572 |
| 4,951,217 | 8/1990 | Clack et al. | 364/474.18 |
| 5,134,570 | 7/1992 | Nankaku | 364/474.18 X |

FOREIGN PATENT DOCUMENTS

| | | |
|---|---|---|
| 59-72514 | 4/1984 | Japan . |
| 636605 | 1/1988 | Japan . |

Primary Examiner—Jerry Smith
Assistant Examiner—Thomas E. Brown
Attorney, Agent, or Firm—Sughrue, Mion Zinn Macpeak & Seas

[57] ABSTRACT

A method of displaying a figure on the screen of a CRT of an NC system so that an operator can easily confirm whether or not a machining locus which is formed by a machining path of a wire electrode in a wire cut electric discharge machining apparatus during an operation of machining a workpiece to he machined according to an NC program, includes a closed loop machining path. The closed loop may cause undesired deformation of the workpiece finally machined. With such an NC controlled machining system, an accurate correction for the machining locus can be accomplished with ease, and therefore the machining apparatus is high in reliability and operability.

2 Claims, 6 Drawing Sheets

METHOD FOR DISPLAYING A FIGURE ON A CATHODE RAY TUBE OF A NUMERICAL CONTROL SYSTEM

BACKGROUND OF THE INVENTION

This invention relates to a method for displaying a figure on a screen of the cathode ray tube (CRT) for use in a numerical control (NC) system. More particularly, the invention relates to a method of displaying a figure on the screen of the CRT of the NC system so that an operator can easily confirm whether or not the figure (a machining locus), which is formed by a machining path of a machining tool (that is, a wire electrode in a wire cut electric discharge machining apparatus) during an operation of machining a workpiece to be machined according to an NC program, includes a closed loop machining path.

FIG. 1 is a block diagram for showing the construction of an NC system used for a conventional wire cut electric discharge machining apparatus (hereunder abbreviated as WEDM) apparatus. In this figure, reference numeral 1 designates a central processing unit (CPU) for processing various data received from other input units; 2, a memory for storing various data; 3, a paper tape input-output (I/O) unit for punching paper tape and reading information recorded in punched paper tape; 4, a CRT for displaying various information; 5, a keyboard for inputting data, instructions, commands and so on; 6, an I/O unit; 7, a flexible disk for receiving and storing data through the I/O unit 6 and outputting therethrough; 8, a data bus for transmitting the data; and 9 a WEDM apparatus for machining a workpiece according to the NC program.

Next, an operation of this conventional NC system will be described hereinbelow.

First, an NC program and data input from the paper tape I/O unit 3, the keyboard 5 and the flexible disk 7 through the I/O unit 6, are analyzed in the CPU 1 so that data representing a machining locus of a wire electrode of the WEDM apparatus on the surface of the workpiece are obtained. Thereafter, the data representing the machining locus are subjected to a wire radius modification processing to obtain actual NC data for driving and controlling the wire electrode of the WEDM apparatus. In the wire radius modification processing, the actual NC data which represents an actual locus of the center of a wire electrode during the machining operation, is obtained by adding both the radius of the wire electrode and a discharge gap to the NC data representing the machined configuration of the workpiece. The actual NC data are then transmitted to the WEDM apparatus 9 through the data bus 8. Further, the CPU 1 can control the CRT 4 to display a graphic form of the machining locus as shown in FIG. 2 on the basis of the NC data transmitted to the WEDM apparatus 9. FIG. 3 is a schematic diagram showing an enlarged view of details of a portion $P_4$ in FIG. 2. In FIG. 3, a wire path 100 (A-B-C-D) indicates the configuration finally machined according to the NC program. Further, as described above, it is usual in the wire cut electric discharge machining operation to modify the wire path according to the wire radius modification processing to obtain the actual NC data representing the machining locus of the wire electrode by way of shifting the wire path by a sum of the wire radius and the discharge gap. The machining locus modified in this way is shown by a dashed line 101 and 102 (A'-B'-C'-D') in FIG. 3. As is apparent from this figure, in the case where the original wire path (A-B-C-D) is modified with a wire radius modification h larger than a radius r of an arc portion B-C, there occurs a closed loop 102 (E'-B'-C') in the modified machining locus 101 (A'-B'-C'-D'). This closed loop 102 causes an excessive cutting or uncutting to occur in the machined workpiece, as a result of which the configuration of the thus machined workpiece is different from the desired configuration of the workpiece machined according to the NC programmed data, that is the instructed machining configuration. This results in occurrence of defects or other trouble in the EDM operation. It should be noted that it is difficult to detect the occurrence of such a closed loop in the modified machining locus from the graphic display shown in FIG. 2.

In the conventional NC system, the wire path is displayed on the screen of the CRT in such a manner as described above. Hence, the conventional method for displaying the wire path by using the CRT of the NC system is disadvantageous in that it is difficult to readily detect whether or not there occurs a closed loop in the machining locus which may cause a deformation in the workpiece machined according to the actual NC data after the wire radius modification processing.

SUMMARY OF THE INVENTION

The present invention is accomplished to eliminate the above described drawback accompanying the conventional method for displaying the wire path on a CRT of the NC system.

It is accordingly an object of the present invention to provide a method for displaying a machining locus of a wire electrode for shaping a workpiece into a configuration defined by an actual NC program on the screen of a CRT of an NC system, in which it is easily possible for an operator to confirm whether or not there occurs a closed loop in the machining locus of the wire electrode after a wire radius modification processing, which may ultimately cause the deformation of the workpiece machined.

The above, and other objects of the present invention, are accomplished by the provision of a method for displaying a wire path for shaping a workpiece into a form defined by an NC program on the screen of a CRT of an NC system in which it is determined whether or not a closed loop is present in a wire path and, if present, segments composing the closed loop are displayed on the screen of the CRT in a color different from the color used for showing segments of the wire path other than the segments composing the closed loop.

BRIEF DESCRIPTION OF THE DRAWINGS

Other features, objects and advantages of the present invention will become apparent from the following description of a preferred embodiment with reference to the drawings in which like reference characters designate like or corresponding parts throughout the several views.

In the accompanying drawings.

DETAILED DESCRIPTION OF THE PREFERRED EMBODIMENT

Hereinafter, a preferred embodiment of the present invention will be described with reference to the accompanying drawings.

Figure 4:
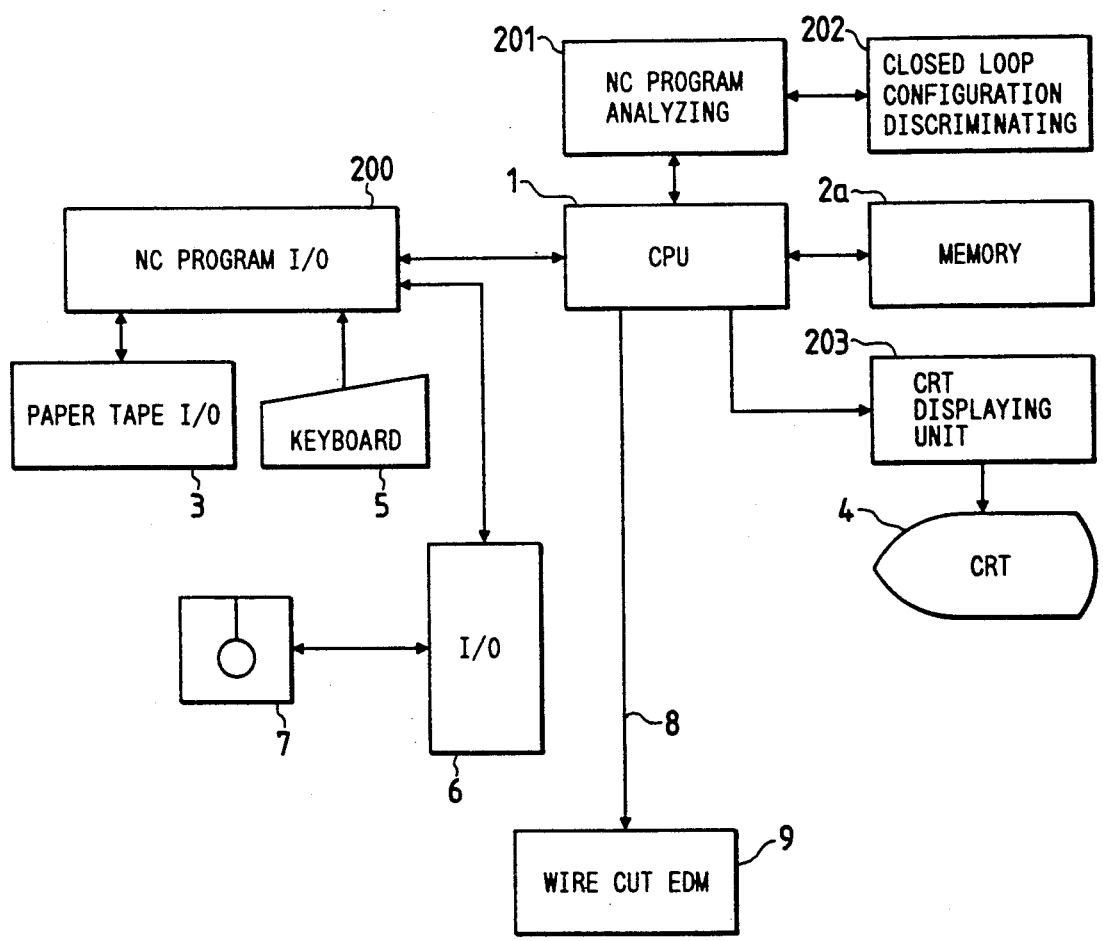
FIG. 4 is a schematic diagram for showing the construction of an NC system for use in a WEDM apparatus which performs a method embodying the present invention.

Referring first to FIG. 4, there is shown an NC system for use in a WEDM apparatus which performs a method embodying the present invention.

Figure 1:
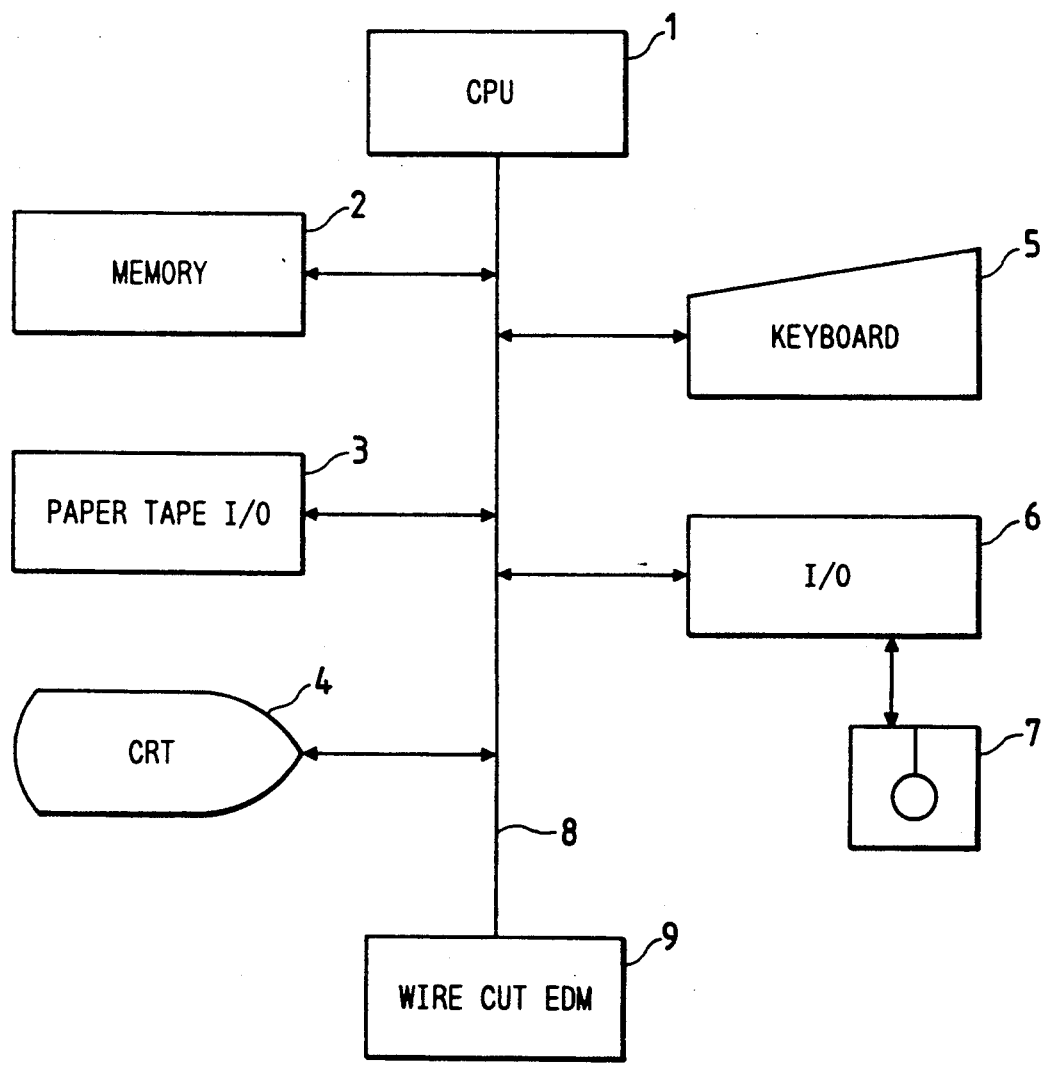
FIG. 1 is a schematic block diagram for showing the construction of a conventional NC system for use in a wire cut electric discharge machining apparatus.
Figure 2:
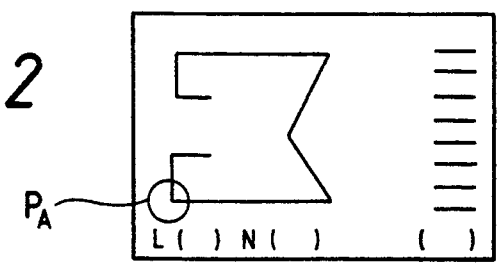
FIG. 2 is a diagram for showing an example of a wire path (machining locus) for machining a workpiece into a shape defined by an NC program.

In FIG. 4, like reference numerals indicate like portions of the system of FIG. 1, the descriptions of which are omitted herein. Further, in FIG. 4 reference numeral 2a indicates a memory which has functions of the memory 2 of the conventional system as well as functions of storing a machining locus of a wire electrode which is modified according to wire radius modification processing (as described above), a flag indicating an occurrence of a closed loop and the positions of the closed loop.

An operation of this system will be described hereinbelow with reference to FIG. 5 which is a flowchart of an operation of checking graphic forms displayed on the screen of the CRT of the system of FIG. 4.

When the system is operated in a graphic form checking mode, the CPU 1 reads an NC program for the graphic form checking operation (hereunder referred to simply as the checking program) and data through an NC program I/O unit 200 from the paper tape I/O unit 3 or the I/O unit 6 connected to the flexible disk 7 in step S1.

Then, the checking program advances to step S2 which causes an NC program analyzing unit 201 to analyze the NC program. As a result, if it is not necessary to perform wire radius modification processing, the checking program skips to step S6 where the CRT 4 is controlled to display a machining path on the basis of the results of the analysis. In contrast, if it is necessary to perform the wire radius modification processing, the following processing is performed. That is, if the results of the analysis effected in the step S2 indicate that the wire radius modification processing is needed, the checking program advances to step S3 where the CPU 1 performs wire radius modification processing. Thereafter, the checking program advances to step S4 which causes a closed loop discriminating unit 202 to perform closed loop checking processing as follows.

Figure 3:
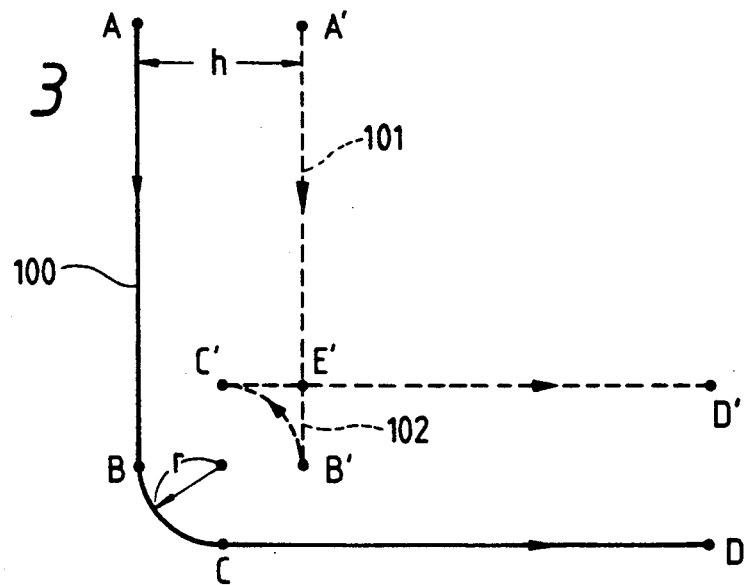
FIG. 3 is a schematic diagram showing an enlarged view of details of a portion $P_A$ shown in FIG. 2.
Figure 8:
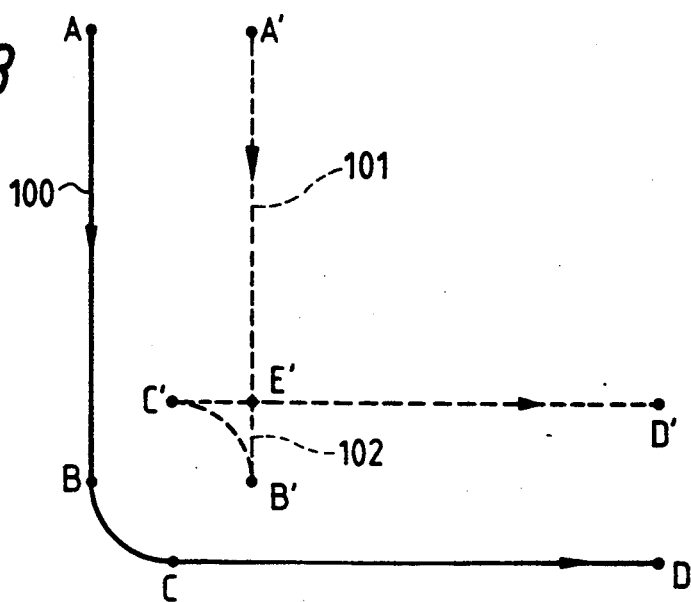
FIG. 8 is a diagram for showing an example of wire paths and a closed loop displayed on the screen of a CRT by the method embodying the present invention.
Figure 6:
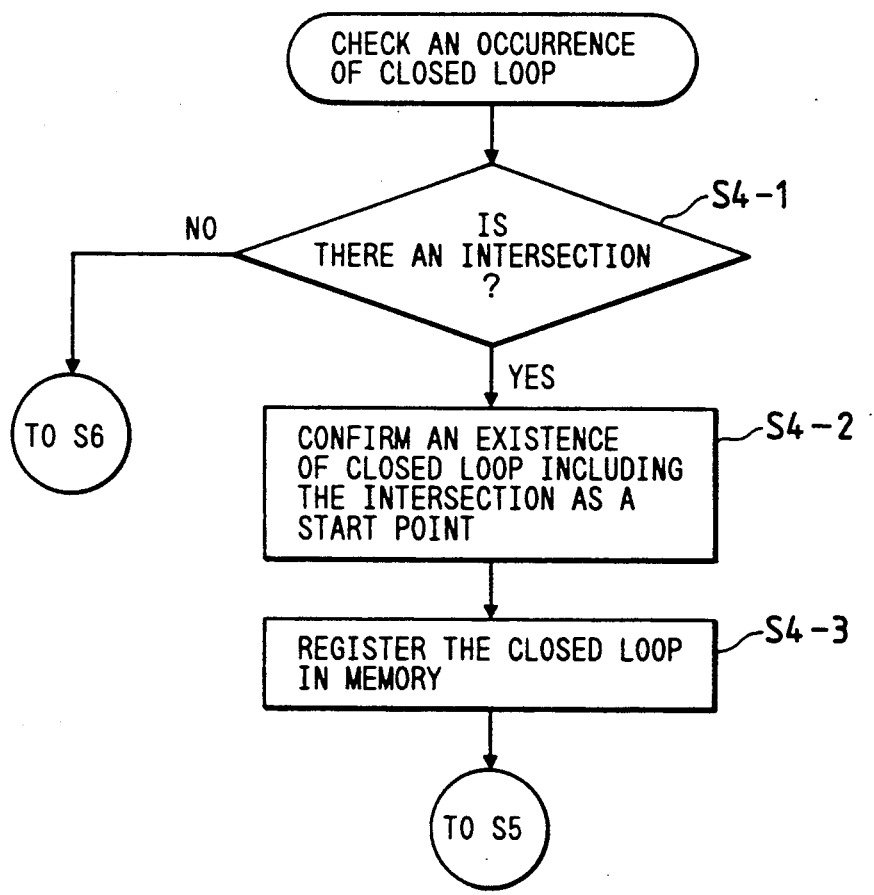
FIG. 6 is a flowchart of details of a step S4 of the graphic checking operation by the method of FIG. 5.

As shown in FIG. 6, which is a flowchart showing details of the step S4, the CPU 1 first operates to obtain a segment C'D' of the machining locus which is obtained by subjecting a segment CD of the machining path to the wire radius modification processing. Then, the checking program enters step S4-1 where the CPU 1 examines whether or not there is any intersection of the thus obtained machining segment C'D' and the machining segments A'B' and B'C' the data of which has been stored in the memory 2a. In this case, if there is no intersection, the checking program then is allowed to advance to a step S6 which causes the CRT 4 to display the actual machining locus. On the other hand, the CPU 1 operates to detect whether or not the machining locus passes through the same point twice or not. If the CPU 1 detects that there is an intersection E' as shown in FIG. 3 for instance because the machining locus A'-B'-C'-D' can be represented by A'-E'-B'-C'-E'-D' including the same point E' twice, the CPU 1 determines that the segment C'D' forms the closed loop E'-B'-C' with the segments A'B' and B'C'. This is carried out in the step S4-2. Then, the checking program advances to step S4-3 where the CPU 1 operates to register the data as to the closed loop E'-B'-C'-E' in the memory 2a as a portion 102 at which a closed loop occurs. Subsequently, the checking program advances to step S5 where a flag indicating an occurrence of the closed loop is added.

Figure 7:
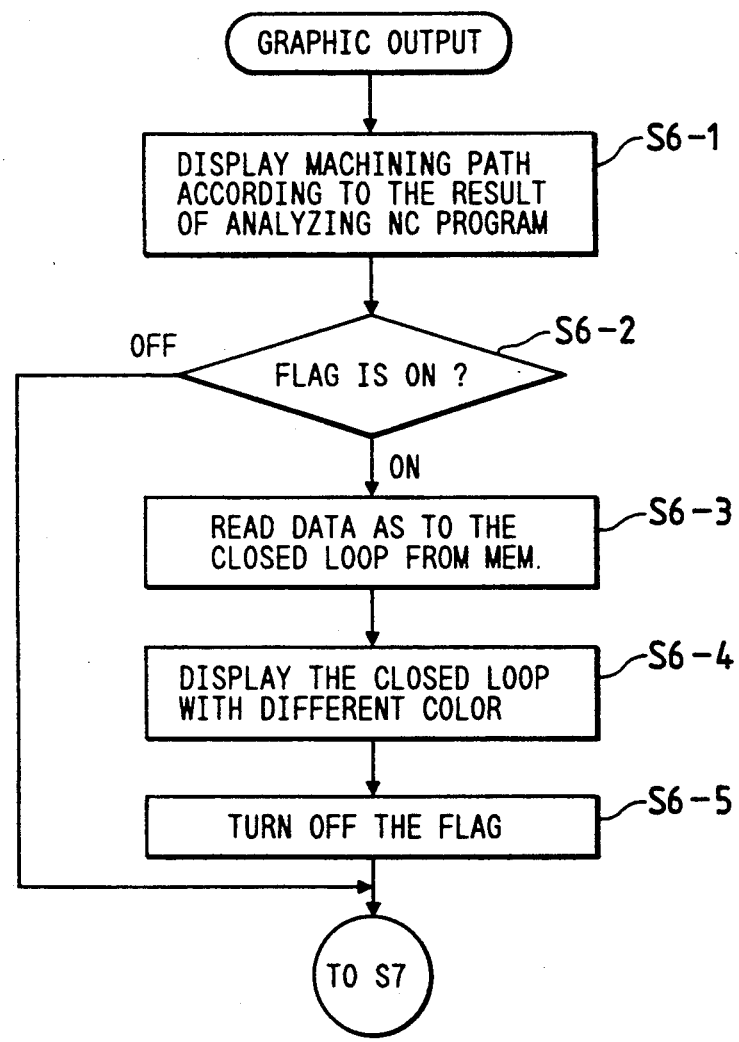
FIG. 7 is a flowchart of details of a step S6 of the graphic checking operation by the method of FIG. 5.

Subsequent to the step S5, the checking program enters step S6 of which details will be described hereinbelow with reference to a flowchart of FIG. 7. That is, the checking program first enters step S6-1 in which the CPU 1 causes a CRT displaying unit 203 to display the machining path or the modified machining locus thereon. Thereafter, the checking program advances to step S6-2 which examines whether the closed loop occurrence flag is on or not. If not, the checking program is allowed to skip to branching step S7. In contrast, in case of the flag being on, the following processing will be effected. That is, the checking program first enters branching step S6-3, in which the CPU 1 fetches data concerning the closed loop from the memory 2a. Then, the checking program advances to step S6-4 in which the CRT displaying unit 203 controls the CRT display 4 to display the portion of the closed loop 102 with a color different from colors indicating the remaining portions of the machining path. Then, the checking program advances to step S6-5 in which the closed loop occurrence flag is turned off. Thereafter, the checking program advances to step S7 in which it is detected whether or not the graphic form checking operation is to be terminated.

Figure 5:
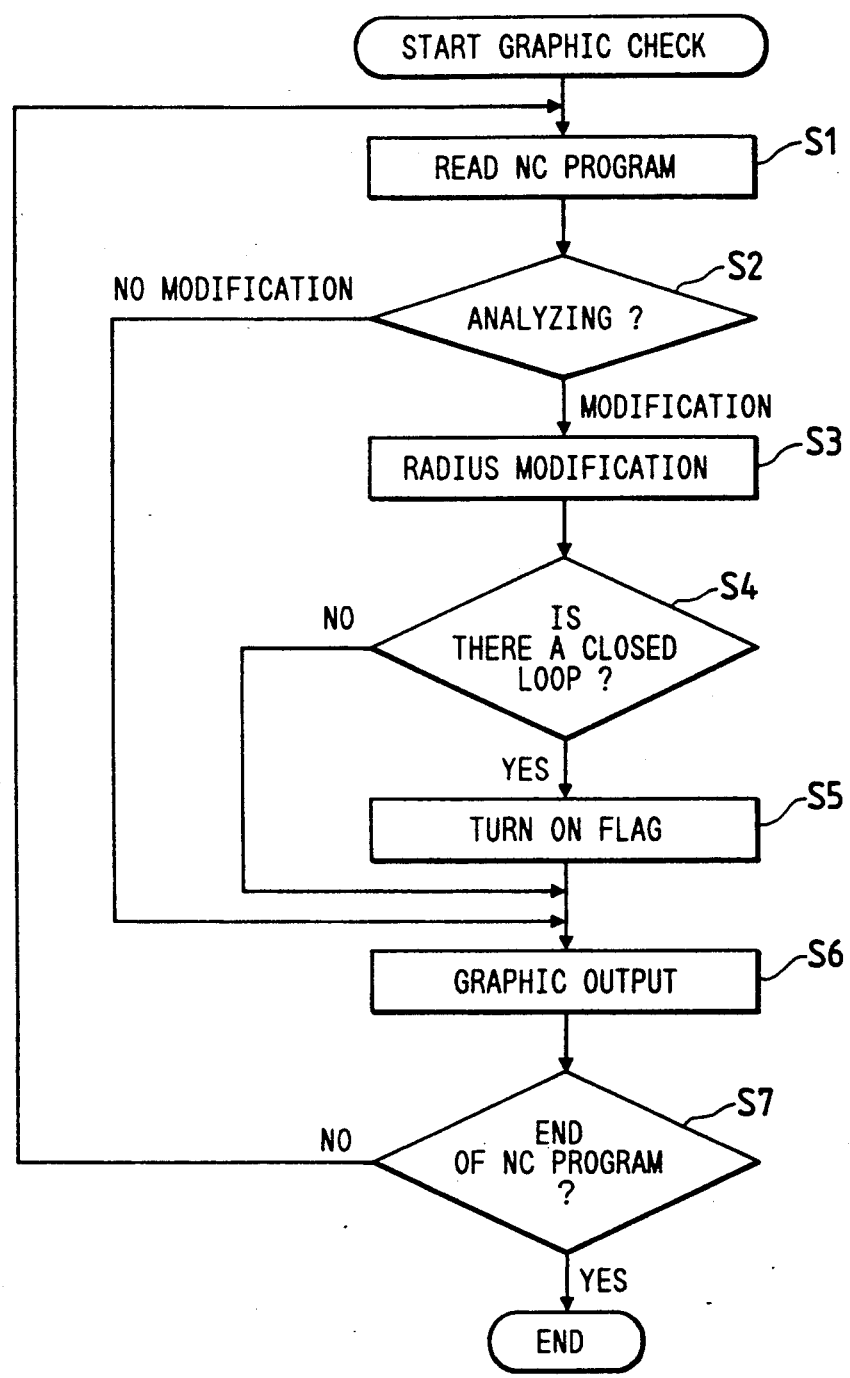
FIG. 5 is a flowchart of an operation of checking graphic forms by a method embodying the present invention.

In summary, in case of checking graphic forms of FIG. 5, after the graphic data of the segment C'D' are outputted to the the CRT 4 to display the segment C'D' thereon, the CPU 1 confirms whether the closed loop occurrence flag is turned on or not. If the flag is turned on, the CPU 1 fetches the data concerning the portion where the closed loop 102 (E'-B'-C'-E') occurs, from the memory 2a. Then, the closed loop 102 (E'-B'-C'-E') is displayed on the display 4 with a loud color.

Further, upon completion of processing of a series of the NC program, the CPU 1 determines whether or not there is a termination code in step S7. If not, the checking program returns to step S1 to continue the above described series of operations. In contrast, if there is a termination code, the operation is terminated.

Although an NC system for use in a WEDM apparatus is described hereinbefore as a preferred embodiment of the present invention, modifications are possible without departing from the esential scope of the present invention. More particularly, the present invention can be available in an NC system for use in a machining apparatus other than the wire cut EDM apparatus.

What is claimed is:

1. A method for displaying a machining path of a cutting tool for machining a workpiece into a form defined by a numerical control (NC) program on a displaying means of an NC system, said method comprising the steps of:

checking whether or not a closed loop is present in an actual path of said cutting tool which is obtained by subjecting said machining path to modification; and displaying, if a closed loop is present in the actual path, the closed loop on said display means with a color different from colors which are used to indicate the remaining portion of said machining path, wherein said checking step comprises the steps of:

judging whether the closed loop is present in the machining path of said cutting tool;

storing, if present, data as to the closed loop in a first memory means; and setting a flag in a second memory means after the presence of the closed loop is detected to indicate the presence of the closed loop, and wherein said displaying step comprises the steps of:

determining if the flag is set in said second memory means;

fetching, if the flag is set, data as to the closed loop from said first memory means; and changing the data on the closed loop so as to display the closed loop with the different color from those indicating the remaining portions of said machining path on said display means.

2. The method according to claim 1, wherein said judging step includes:

detecting a point of intersection of segments forming the machining path of said cutting tool; and determining the presence of the closed loop according to the existence of said point of intersection.

* * * * *